United States Patent Office 3,563,954
Patented Feb. 16, 1971

3,563,954
PROCESS FOR PREPARING PURIFIED GLYCERINE
Bernard Michael Birmingham, Jr., Aurora, Ill., assignor to Armour and Company, Chicago, Ill., a corporation of Delaware
No Drawing. Filed Oct. 19, 1967, Ser. No. 676,605
Int. Cl. C07c 29/24
U.S. Cl. 260—637    5 Claims

ABSTRACT OF THE DISCLOSURE

In the process for preparing purified glycerine from sweetwater and like crude glycerine solutions in which the sweetwater is treated with lime and soda ash, evaporated and distilled, and color bleached with activated carbon; the step which comprises treating said sweetwater, after distillation and prior to color bleaching, with an ion exchange resin.

---

This invention relates to an improved process for preparing purified glycerine from sweetwater or like crude glycerine solutions. "Sweetwater" refers to those solutions containing about 5–20% glycerine such as are produced as a by-product in the manufacture of soap or obtained from the manufacture of fatty acids. "Crude glycerine" or "crude glycerol" are those solutions of sweetwater which have been concentrated to about 80–90% glycerine.

One of the common methods of preparing "pure" glycerine which will meet U.S.P. requirements from sweetwater or other similar solutions involves first treating the sweetwater to prepare it for evaporation by removing fatty acids and other impurities present in the untreated sweetwater. This is generally accomplished by first treating the sweetwater with lime to convert the impurities into insoluble compounds and then treating with soda ash to convert any excess lime to insoluble calcium carbonate. The sweetwater is then filtered to remove the insoluble compounds. The filtered sweetwater is evaporated to concentrate the glycerine in the treated sweetwater up to a concentration of about 80–90%. The solution is then distilled to result in a concentrated glycerine of 95–100% purity. Thereafter the glycerine is passed through activated carbon to finally remove impurities and achieve the desired water-white color.

Certain impurities, such as dissolved soap, proteinaceous material dissolved in the soap, volatile organic residues, fatty acid fractions, and the like, frequently referred to as "glycerine pitch" may be carried through the purification process and poison the activated carbon cells in the color-bleaching step. The activated carbon is generally changed when the Hazen color reaches 10, which is about every 48 hours of continuous production. The process must either be stopped or additional carbon cells provided for continued operation while the spent carbon is dumped. This is disadvantageous for a number of reasons. An undermined amount of usable glycerine is lost when the spent carbon is dumped. Further, the frequency changes of activated carbon are expensive, not only in the cost of replacement activated carbon, but also in the additional labor involved and the stoppage of production.

Other methods have been proposed for purifying glycerine, including methods using ion exchange resins. Thus, British Pat. 633,343 issued to the American Cyanamid Company, contemplates the purification of glycerine by eliminating the distillation step and passing the sweetwater through a succession of four pairs of cationic and anionic exchange beds. U.S. Pat. 2,615,924 to Reents teaches a preliminary treatment of the sweetwater with separate beds of cationic and anionic exchange materials and then with a single bed of a substantially homogenous mixture of cationic and anionic ion exchange materials before the sweetwater is concentrated by heating and evaporation. Thus, these methods either substitute ion exchange treatment for the chemical pretreatment of the sweetwater and/or for the distillation of the sweetwater. These methods are not entirely satisfactory because a large quantity and variety of impurities are presented along with the sweetwater to the ion exchange resin. This situation results in the rapid exhaustion of the ion exchange resins, and a corresponding frequent stoppage of operations in order to recharge the ion exchange resins.

Therefore, it is an object and advantage of the present invention to provide an improved process for the preparation of purified glycerine from sweetwater. Another object is to provide an improved process for the preparation of purified glycerine in which the primary causes of activated carbon "poisoning" are removed prior to contacting the glycerine distillate with the active carbon bleach material. Still another object is to minimize the loss of glycerine through the dumping of spent carbon. Other objects and advantages will become apparent upon reading the specification and examples which follow.

It has now been found that the useful life of activated carbon in commercial glycerine production can be increased from about 200 parts throughput of substantially pure glycerine to about 6800 parts when the previously distilled glycerine is passed through an ion exchange resin prior to color bleaching with activated carbon. The ion exchange resin may be washed free of impurities with water at specific intervals, regenerated, and finally rinsed with water to remove the regeneration agent. Thereby any usable glycerol washed free from the resin may be reclaimed, in contrast to the prior method in which usable glycerine is lost when the spent carbon is dumped. Further, the regenerated resin may then be put back into use and the activated carbon may be reserved for its primary purpose of color bleaching, rather than removal of large amounts of carbon poisoning impurities.

Thus in a preferred form of the invention, crude glycerine is conventionally prepared by pretreating sweetwater containing about 15% glycerine first with sufficient lime to convert fatty acids and other alkaline precipitable impurities present in the untreated sweetwater into insoluble compounds and then with soda ash to convert any excess lime into insoluble calcium carbonate. These steps may be performed in the same treatment tank; and these insoluble compounds removed by filtration. The clarified sweetwater is then concentrated by first evaporation to about 80–90% glycerine and then distillation to about 98–100% glycerine and cooled to about 150° F. The cooled glycerine is then passed through an ion exchange bed or cell of a cationic exchange resin in hydrogen ionic form to remove carbon poisoning impurities and then through an activated carbon cell to bleach the glycerine to the desired water-white color and obtain a substantially pure glycerine meeting U.S.P. requirements.

Although virtually any ion exchange resin may be used, cationic exchange resins are preferred, particularly in the hydrogen ionic form. The sodium ionic form is not preferred as it frequently introduces a sodium contaminate into the glycerine solution. In addition, weak base type anionic exchange resins may be employed, either in addition to or instead of the cation exchange resin. Especially preferred ion exchange resins are strong acid type cationic exchangers in the hydrogen ionic form, which generally contain methylene sulfonic or nuclear sulfonic functional groups on a phenolic or polystyrene matrix. Intermediate acid and weak acid type cationic exchangers in the hydrogen ionic form are also desirable.

The mesh size of the exchange resins may be varied and has no effect on the operability of the present process. Selection of a particular mesh range is deemed within the skill of the art and will generally depend upon the viscosity of the glycerine solution passing through the resin. A mesh size range from 50 to 100 is generally desirable.

The temperature of the glycerine solution passing through the resin is immaterial and can be varied from its freezing point to its decomposition temperature.

The concentration of the glycerine solution passing through the resin can be varied from dilute solutions up to 100% glycerine.

The process may be performed on a batch or continuous basis and multiple bed, mixed bed or moving bed systems of exchange resin may be used. That is, cationic and anionic exchange resins could be mixed or they could be used separately with either being first in the series.

The regenerant for the hydrogen ionic cation exchange resin may be either hydrochloric acid or sulfuric acid in various concentrations, such as 4–10% hydrochloric acid or 2–8% sulfuric acid at about 0.5–2.0 g.p.m./cu. ft. The regenerated cation resin may then be rinsed with water, for example at a rate of 40–100 gallons per cubic foot. The regenerant for the anionic exchange resins is generally a caustic solution, usually sodium hydroxide, at various concentration levels, such as 4% sodium hydroxide at a flow rate of 0.5 g.p.m./cu. ft. followed by a water rinse of approximately 50 gallons per cubic foot.

The present invention is further illustrated by the following examples, which are not to be construed any way or manner as imposing limitations upon the scope thereof.

EXAMPLE I

Two 500 mm. condensers having inside diameters of 12 mm. and equipped with water jackets and ground glass fittings were placed in vertical series and connected to an aspirator flask. The upper condenser was packed with two inches of glass wool at the bottom, 10 grams of sand above the glass wool and 10 grams of hydrogen ionic form Dowex 50W–X8 at the top of the column. Dowex 50W–X8 is the trade name for a strong acid cationic exchange resin, of the polystyrene nuclear sulfonic type having about 8% cross-linkage with divinylbenzene, sold by the Dow Chemical Company. The lower condenser was packed in the same manner except that the resin was replaced by 10 grams of activated carbon. Water was circulated through the water jackets at a temperature of 150° F., which is generally the temperature of the glycerine solution when it enters the acivated carbon cells in commercial processes. A vacuum of 30 mm. of mercury was exerted through the aspirator flask at the bottom of the columns.

A total of four units of two condensers as described above were set up. One unit contained 10 grams of activated carbon. The second unit contained 10 grams of anionic resin in chloride ionic form plus 10 grams of carbon. The third unit contained 10 grams of hydrogen ionic form cation resin (Dowex 50W–X8) plus 10 grams of activated carbon. The fourth unit contained 10 grams of the anionic resin plus 10 grams of the cationic resin in addition to 10 grams of activated carbon.

A distilled unbleached glycerine solution containing about 99% glycerine, having a fatty acid and ester content of 0.21% and an alkalinity of 0.01, was put through each unit in 200 gram increments and the resulting color-bleached, water-white glycerine solution was analyzed for Hazen color.

The unit that contained activated carbon alone reached a Hazen color of 20 after only 400 grams throughput. The unit containing anionic resins plus activated carbon reached a Hazen color of 20 after 850 grams throughput. After 2,200 grams throughput, neither the unit containing cation resin and activated carbon nor the unit containing activated carbon an a mixture of anionic and cationic resins had reached a Hazen color of 20 (the former having a Hazen color of 18 and the latter a Hazen color of 16 at this throughput).

EXAMPLE II

Fifteen samples of distilled unbleached glycerine containing about 99% glycerine and having an average fatty acid and ester content of 0.24% and alkalinity average of 0.30 were put through only the activated carbon portion of the unit described in Example I in 200 gram increments, and the resulting product was analyzed for fatty acid and ester content, alkalinity and Hazen color. After a throughput of 200 grams, the average Hazen color of the samples was 10.1, and the activated carbon was considered spent.

400 gram increments of the distilled unbleached glycerine were then run through 10 grams of cationic resin (Dowex 50W–X8) and 10 grams of activated carbon in a unit as described in Example I. After each 400 gram increment, the resin was washed with 1,000 ml. of water, regenerated with 400 ml. of a 5% by volume hydrochloric acid solution, and the excess hydrochloric acid was removed by an additional 400 ml. washing with water. 6,800 grams of the glycerine solution passed through this unit without a change in the activated carbon portion or before a Hazen color of 10 was exceeded.

The resulting water-white glycerine obtained from the cationic resin and activated carbon unit was analyzed and found to meet U.S.P. requirements for 99.5% glycerine. The results of the analysis were as follows:

99.5% U.S.P. glycerine from resin exchange unit

| Tests | Results |
| --- | --- |
| Specific gravity 15°/15° C. | 1.26452. |
| Glycerol | 99.59. |
| Fatty acids and esters | 0.33. |
| Chloride | 2 p.p.m. |
| Sulfate | 1 p.p.m. |
| Color | 4. |
| Appearance | Good. |
| Taste | Meets U.S.P. Test |
| Odor | Meets U.S.P. Test. |
| Carbonizable | Meets U.S.P. Test. |
| Filtration | Meets U.S.P. Test. |
| pH | Neutral to litmus. |

As stated above, the resin was washed with 1,000 ml. of water, regenerated with 400 ml. of hydrochloric acid and finally washed with 400 ml. of water to remove the excess hydrochloric acid. In addition, the condenser containing the activated carbon was also washed at this time to see if any glycerine or impurities could be washed free. These washings were then evaporated. The washings from the carbon yielded almost no residuals; however, the washings from the ion exchange resin yielded about 26 grams of a dark brown, viscous substance similar to glycerine pitch.

The pitch-like substance obtained above is believed to be responsible for the discoloration of glycerine and the poisoning of activated carbon. This was evaluated by running 500 ml. of distilled unbleached glycerine solution through the resin plus activated carbon unit and reading the Hazen color of the bleached water-white product. The Hazen color obtained was 5. 1000 ml. of water was then run through the unit to wash impurities from the resin onto the carbon. The condenser containing the resin was separated from the condenser containing the activated carbon, and the resin was regenerated with a 5% hydrochloric acid solution. Thereafter 200 ml. of distilled unbleached glycerine solution were run through the resin plus activated carbon unit again, and the Hazen color determined. The Hazen color obtained this time was 15, indicating that the impurities removed from the distilled unbleached glycerine by the ion exchange resin were entrained by the carbon when these impurities were washed free from the resin by water. Thereby, it is clear that the resin removes these discoloring pitch-like residues before they can poison the activated carbon. Since the Hazen color increased from 5 to 15, these pitch-like impurities obviously poisoned the carbon cells; and since these residues are held to the resin only by an ionic surface attraction, they can be washed free from the resin which can then be regenerated with hydrogen ions and reused.

While this invention has been described with respect to specific embodiments, it is not so limited and it is to be understood that variations and modifications thereof, obvious to those skilled in the art, may be made without departing from the spirit or scope of this invention.

What is claimed is:

1. In the process for preparing purified glycerine from sweetwater containing from about 5–20% glycerine, in which the sweetwater is treated to remove alkaline precipitate impurities, evaporated to about 80–90% glycerine, distilled to about 95–100% glycerine and color bleached with activated carbon; the improvement comprising the step of passing the distilled glycerine through a strong acid cation exchange resin bed in the hydrogen ionic form to remove impurities prior to said color bleaching.

2. The process of claim 1 in which said resin is a polystyrene nuclear sulfonic type having about 8% cross-linkage with divinylbenzene.

3. The process of claim 1 in which said resin bed contains a mixture of cationic and anionic exchange resins.

4. The process of claim 1 in which said improvement comprises the step of passing the distilled glycerine through a cationic exchange resin bed and an anionic exchange resin bed.

5. In the process for preparing a purified glycerine from sweetwater solutions containing from about 5–20% glycerine in which said solutions are treated with lime and soda ash, evaporated to about 80–90% glycerine, distilled to about 95–100% glycerine and color bleached with activated carbon; the improvement comprising the step of passing the distilled glycerine through a strong acid cationic exchange resin in hydrogen ionic form prior to said color bleaching.

References Cited

UNITED STATES PATENTS

| | | | |
|---|---|---|---|
| 1,824,507 | 9/1931 | Schwarz | 260—637A |
| 2,381,055 | 8/1945 | Hoyt | 260—637A |
| 2,615,924 | 10/1952 | Reents | 260—637A |
| 2,628,986 | 2/1953 | Wallace et al. | 260—643F |
| 3,231,329 | 1/1966 | Weiss et al. | 260—637A |
| 3,243,465 | 3/1966 | Weiss et al. | 260—637A |
| 3,252,897 | 5/1966 | Hesler et al. | 260—637A |
| 3,454,655 | 7/1969 | Liao et al. | 260—637A |

FOREIGN PATENTS

| | | | |
|---|---|---|---|
| 524,300 | 12/1953 | Belgium | 260—637A |
| 470,665 | 1/1951 | Canada | 260—637A |

OTHER REFERENCES

Stromquist et al., "Ind. & Eng. Chem.," vol. 43, (1951), pp. 1065 to 1070.

BERNARD HELFIN, Primary Examiner

J. E. EVANS, Assistant Examiner

U.S. Cl. X.R.

260—2.1, 2.2